L. F. FULLER.
HEAT EQUALIZING AND RADIATING PLATE.
APPLICATION FILED MAY 2, 1912.

1,063,526.

Patented June 3, 1913.

Witnesses

L. F. Fuller, Inventor
by C. A. Snow & Co.
Attorneys

UNITED STATES PATENT OFFICE.

LOUIS F. FULLER, OF GIRARD, KANSAS.

HEAT EQUALIZING AND RADIATING PLATE.

1,063,526.   Specification of Letters Patent.   Patented June 3, 1913.

Application filed May 2, 1912. Serial No. 694,662.

*To all whom it may concern:*

Be it known that I, LOUIS F. FULLER, a citizen of the United States, residing at Girard, in the county of Crawford and State of Kansas, have invented a new and useful Heat Equalizing and Radiating Plate, of which the following is a specification.

The present invention relates to improvements in heat equalizing and radiating plates, the primary object of the present invention being the provision of a metal plate composed of a good conductor of heat and shaped to fit upon or over the burner to be interposed between the burner and the cooking utensil, the said plate being provided with depressions and elevations, which co-act with the bottom of the utensil to provide a plurality of chambers, said chambers forming heat absorbing portions between the plate and utensil, while the contacting surface of the metal with the utensil will properly radiate the heat, to equalize the same throughout the bottom of the utensil.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
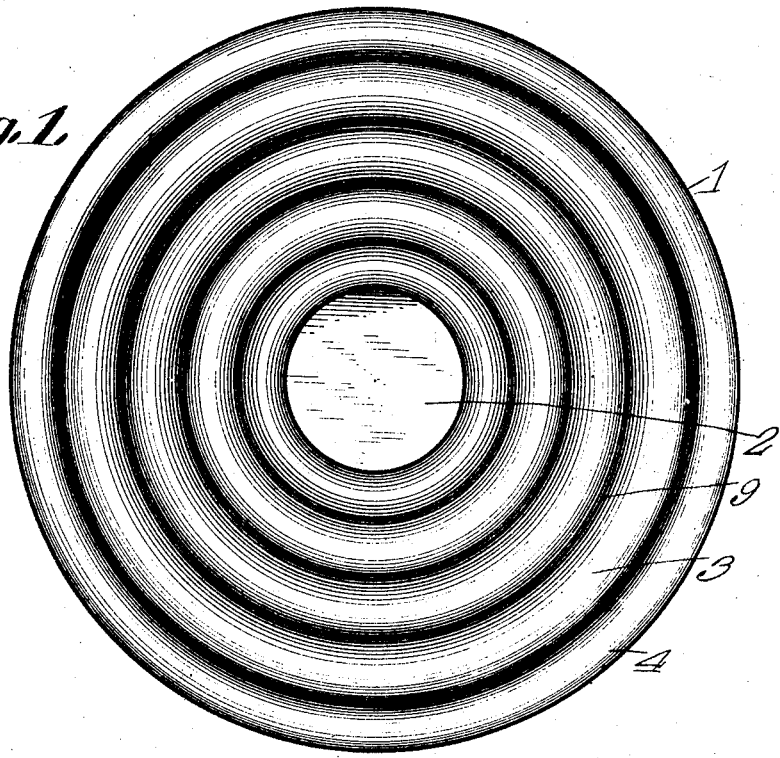
Figure 2:
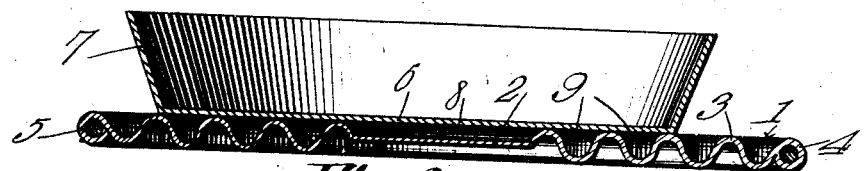
Figure 3:
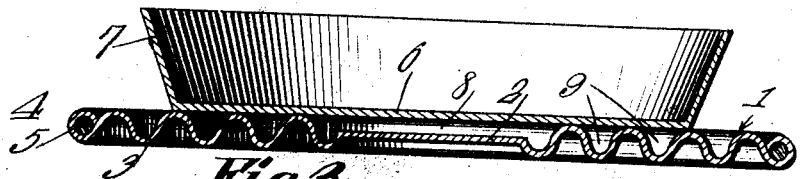

In the drawings Figure 1 is a plan view of the plate, taken from the upper side as viewed in Fig. 2. Fig. 2 is a cross section through the plate as shown in Fig. 1 with a utensil shown in section thereupon. Fig. 3 is a similar view to Fig. 2, the plate being reversed.

Referring to the drawings, the numeral 1 designates the plate which is preferably made circular in plan and is composed of cast or stamped metal, preferably aluminum, or in fact any good conductor of heat. The center 2 of the plate is a plain surface and is surrounded, as clearly shown, with a plurality of concentric convolutions 3, which provide the alternating elevations and depressions in both sides of the plate, while the outer rim 4 is curled and retains the wire 5 to give stiffness to the plate and to, at the same time increase the heat retaining surface.

With the bottom 6 of the utensil 7 placed in position as shown in Figs. 2 and 3, it will be seen that a central chamber 8 is provided, while a plurality of concentric chambers 9 are also provided, thus forming a plurality of air chambers which serve to reduce the intensity of the heat and to a great extent distribute the same throughout the plate. By this means the flame does not come in direct contact with the center of the utensil and thus does not cause the center to boil or to be heated more rapidly than the outer portion of the bottom of the utensil, but causes the heat to be radiated and equalized throughout the lower surface of said utensil to attain a uniform heat throughout the area of the plate and the bottom of such utensil.

It is evident that the plate may be reversed from the position as shown in Fig. 2 to that shown in Fig. 3, wherein the greater area of air chamber may be provided centrally of the plate, this being particularly desirable when the utensil is of a larger area.

What is claimed is:

1. A heat equalizing and radiating plate having a central circular disk and a plurality of convolutions extending outwardly and concentrically of said central disk, the elevated portions of the convolutions upon each side of the plate forming a utensil rest with the disk below the facial lines of such elevations.

2. The combination with a cooking utensil, of a heat equalizing and radiating plate, having a flat central disk and a plurality of concentrically disposed convolutions, the elevations of which upon either side of the plate when in contact with the bottom of the utensil to form a central air chamber and a plurality of concentrically disposed annular air chambers.

3. A heat equalizing and radiating plate, having a central circular disk and a plurality of convolutions extending outwardly and concentrically of said central disk, the outer convolution being turned inwardly toward the body of the plate to form a rim, a reinforcement wire in said rim, the elevated portions of the convolutions upon each side of the plate forming a utensil rest with the central disk centrally of the two facial lines of the convolutions to form with the utensil a central chamber.

In testimony that I claim the foregoing as my own, I have hereto affixed my signature in the presence of two witnesses.

LOUIS F. FULLER.

Witnesses:
 FRED D. WARREN,
 C. L. PHIFER.